(12) United States Patent
Muta

(10) Patent No.: US 10,286,896 B2
(45) Date of Patent: May 14, 2019

(54) HYBRID VEHICLE

(71) Applicant: TOYOTA JIDOSHA KABUSHIKI KAISHA, Toyota-shi, Aichi-ken (JP)

(72) Inventor: Koichiro Muta, Okazaki (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 274 days.

(21) Appl. No.: 15/248,514

(22) Filed: Aug. 26, 2016

(65) Prior Publication Data

US 2017/0066433 A1 Mar. 9, 2017

(30) Foreign Application Priority Data

Sep. 3, 2015 (JP) ................... 2015-173847

(51) Int. Cl.
*B60K 6/365* (2007.10)
*B60K 6/387* (2007.10)
(Continued)

(52) U.S. Cl.
CPC ............. *B60W 20/14* (2016.01); *B60K 6/365* (2013.01); *B60K 6/387* (2013.01); *B60K 6/445* (2013.01);
(Continued)

(58) Field of Classification Search
CPC ...... B60W 20/14; B60W 10/18; B60W 10/06; B60W 10/08; B60W 10/26;
(Continued)

(56) References Cited

U.S. PATENT DOCUMENTS

2013/0231511 A1 9/2013 Aoki
2013/0231811 A1* 9/2013 Aoki ................... B60L 11/18
701/22
(Continued)

FOREIGN PATENT DOCUMENTS

JP 2009-126257 A 6/2009
JP 2011-183917 A 9/2011
(Continued)

OTHER PUBLICATIONS

Machine Translation of JP 2013-183525 retrieved from Espacenet on Jul. 23, 2018 (Year: 2018).*
(Continued)

*Primary Examiner* — Thomas Ingram
(74) *Attorney, Agent, or Firm* — Finnegan, Henderson, Farabow, Garrett & Dunner, LLP

(57) ABSTRACT

A hybrid vehicle includes an electric control unit. A predictable condition may be a condition that the time period from beginning of a charging of a battery to beginning of a rapid decrease in charged electricity is predicted to be within a specified time period. The electronic control unit may be configured to control a first motor such that a motoring of an engine is performed at a first speed by the first motor. The electronic control unit may be configured to prevent motoring of the engine by the first motor when the predictable condition is not satisfied. The electronic control unit may be configured to control the first motor such that the motoring of the engine is performed at a second speed that is higher than the first speed by the first motor when the predictable condition is satisfied.

7 Claims, 6 Drawing Sheets

(51) Int. Cl.
*B60K 6/445* (2007.10)
*B60W 10/06* (2006.01)
*B60W 10/08* (2006.01)
*B60W 10/18* (2012.01)
*B60W 10/26* (2006.01)
*B60W 20/14* (2016.01)

(52) U.S. Cl.
CPC ............ *B60W 10/06* (2013.01); *B60W 10/08* (2013.01); *B60W 10/18* (2013.01); *B60W 10/26* (2013.01); *B60W 2510/1005* (2013.01); *B60W 2510/244* (2013.01); *B60W 2510/246* (2013.01); *B60W 2520/10* (2013.01); *B60W 2540/10* (2013.01); *B60W 2540/16* (2013.01); *B60W 2710/0627* (2013.01); *B60W 2710/0644* (2013.01); *B60W 2710/083* (2013.01); *B60W 2710/18* (2013.01); *B60W 2710/244* (2013.01); *B60W 2710/248* (2013.01); *Y02T 10/6239* (2013.01); *Y02T 10/6286* (2013.01); *Y02T 10/7258* (2013.01)

(58) Field of Classification Search
CPC ..... B60W 2710/18; B60W 2510/1005; B60W 2710/244; B60W 2510/244; B60W 2520/10; B60W 2510/246; B60W 2710/0627; B60W 2710/248; B60W 2710/083; B60W 2540/16; B60W 2540/10; B60W 2710/0644; B60K 6/365; B60K 6/445; B60K 6/387; Y02T 10/7258; Y02T 10/6239; Y02T 10/3286
See application file for complete search history.

(56) References Cited

U.S. PATENT DOCUMENTS

| | | | |
|---|---|---|---|
| 2013/0304294 A1* | 11/2013 | Hosoe | B60W 10/06 701/22 |
| 2013/0311029 A1* | 11/2013 | Tagawa | B60K 6/445 701/22 |
| 2014/0180517 A1 | 6/2014 | Endo | |

FOREIGN PATENT DOCUMENTS

| | | |
|---|---|---|
| JP | 2013-183525 A | 9/2013 |
| JP | 2014-125078 | 7/2014 |
| JP | 2014-220156 A | 11/2014 |

OTHER PUBLICATIONS

Machine Translation of JP 2011-183917 retrieved from Espacenet on Jul. 23, 2018 (Year: 2018).*

* cited by examiner

HYBRID VEHICLE

INCORPORATION BY REFERENCE

The disclosure of Japanese Patent Application No. 2015-173847 filed on Sep. 3, 2015, is incorporated herein by reference in its entirety.

BACKGROUND

Technical Field

The present disclosure relates to a hybrid vehicle.

Description of Related Art

Japanese Patent Application Publication No. 2014-125078 (JP 2014-125078 A) discloses such a hybrid vehicle that is configured by including: an engine; a first motor; a planetary gear that includes a sun gear, a carrier, and a ring gear connected to the first motor, the engine, and a drive shaft that is coupled to an axle; a second motor that is connected to the drive shaft; and a battery that supplies/receives electricity to/from the first motor and the second motor, and applies a braking force to the vehicle by regenerative drive of the second motor and motoring of the engine, which is in a state where fuel injection is stopped, by the first motor when an accelerator is off. In this hybrid vehicle, excess charging of the battery may be suppressed by motoring of the engine by the first motor, so as to consume the electricity by the first motor when the accelerator is off.

Deterioration of the battery may be promoted when the battery is continuously charged with relatively high charge electricity (charge current). Accordingly, in order to suppress the deterioration of the battery from being promoted, when the battery is continuously charged, permissible charged electricity of the battery can be set such that a time period from beginning of the charging to beginning of a rapid decrease in the charged electricity is shortened, and a decrease amount per unit time (a decreased rate) at the beginning of the rapid decrease in the charged electricity is increased as the charged electricity of the battery is increased. When the charged electricity starts being rapidly decreased, an engine speed may have to be rapidly increased, and consumed electricity by the first motor may have to be rapidly increased. However, when an increase amount in the engine speed per unit time is relatively large, a driver possibly receives a sense of discomfort.

SUMMARY

A hybrid vehicle of the present disclosure can suppress a driver from receiving a sense of discomfort when an accelerator remains off.

A hybrid vehicle of the present disclosure is a hybrid vehicle that may include: an engine; a first motor; a planetary gear, three rotational elements which are respectively connected to a rotational shaft of the first motor, an output shaft of the engine, and a drive shaft coupled to an axle, the three rotational elements being connected such that the rotational shaft, the output shaft, and the drive shaft are aligned in this order in a collinear diagram; a second motor connected to the drive shaft; a battery for supplying/receiving electricity to/from the first motor and the second motor; setting means for setting permissible charged electricity and permissible discharge electricity of the battery; and an electronic control unit for controlling the engine, the first motor, and the second motor such that the vehicle travels while the battery is charged/discharged within ranges of the permissible charged electricity and the permissible discharge electricity, and is summarized that the setting means sets the permissible charged electricity such that a time period from beginning of the charging to beginning of a rapid decrease in charged electricity is shortened and a decrease amount per unit time at the beginning of the rapid decrease in the charged electricity is increased as the charged electricity of the battery is increased when the battery is continuously charged, and that, in the case where acceleration off control for controlling the first motor and the second motor such that the battery is charged within the range of the permissible charged electricity at least in conjunction with regenerative drive of the second motor in a state where fuel injection of the engine is stopped and a braking force corresponding to acceleration off is applied to the vehicle is executed during the acceleration off, the electronic control unit controls the first motor such that the engine is motoring at a first speed by the first motor or that the motoring of the engine is not performed by the first motor when a predictable condition, in which the time period from the beginning of the charging to the beginning of the rapid decrease in the charged electricity is predicted to fall within a specified time period, is not satisfied in the time period from the beginning of the charging to the beginning of the rapid decrease in the charged electricity, and the electronic control unit controls the first motor such that the motoring of the engine is performed by the first motor at a second speed that is higher than the first speed, and controls the first motor such that the motoring of the engine is performed by the first motor at a speed at which the charged electricity falls within the range of the permissible charged electricity from the beginning of the rapid decrease in the charged electricity onward when the predictable condition is satisfied.

In the hybrid vehicle of this disclosure, the engine, the first motor, and the second motor may be controlled such that the vehicle travels while the battery is charged/discharged within the ranges of the permissible charged electricity and the permissible discharge electricity. Then, when the battery is continuously charged, the permissible charged electricity can be set such that the time period from the beginning of the charging to the beginning of the rapid decrease in the charged electricity is shortened and the decrease amount per unit time at the beginning of the rapid decrease in the charged electricity is increased as the charged electricity of the battery is increased. Here, the "rapid decrease" means that the decrease amount per unit time is larger than a specified decrease amount. In addition, when the acceleration off control for controlling the first motor and the second motor such that the battery is charged within the range of the permissible charged electricity at least in conjunction with the regenerative drive of the second motor in the state where the fuel injection of the engine is stopped and that the braking force corresponding to the acceleration off is applied to the vehicle is executed during the acceleration off, the following control may be executed. When the predictable condition, in which the time period from the beginning of the charging to the beginning of the rapid decrease in the charged electricity is predicted to fall within the specified time period, is not satisfied in the time period from the beginning of the charging to the beginning of the rapid decrease in the charged electricity, the first motor can be controlled such that the motoring of the engine is performed at the first speed by the first motor, or the motoring of the engine is not performed by the first motor. Alternatively, when the predictable condition is satisfied in the time period from the beginning of the charging to the beginning of the rapid decrease in the charged electricity, the first motor can be controlled such that the motoring of the engine is performed at the second speed that is higher than the first speed by the first motor. From the beginning of the rapid decrease in the charged electricity onward, the first motor can be controlled such that the motoring of the engine is performed by the first motor at the speed, at which the charged electricity falls within the range of the permissible charged electricity. When the charged electricity starts being rapidly decreased, the engine speed may start being rapidly increased. In the hybrid vehicle of the present disclosure, the engine speed at the time when the predictable condition is satisfied may be increased to be higher than the engine speed at the time when the predictable condition is not satisfied in the time period from the beginning of the charging to the beginning of the rapid decrease in the charged electricity. In this way, compared to a vehicle in which the engine speed at the time when the predictable condition is satisfied is set to be the same as the engine speed at the time when the predictable condition is not satisfied (set at a value 0 or the first speed), consumed electricity by the first motor may be increased, and the charged electricity of the battery may be decreased when the predictable condition is satisfied. Accordingly, it is possible to suppress shortening of a time period until the beginning of the rapid decrease in the charged electricity of the battery and to suppress shortening of a time period until beginning of a rapid increase in the engine speed. In addition, it is possible to suppress an increase in the decrease amount per unit time at the beginning of the rapid decrease in the charged electricity of the battery and to suppress an increase in an increase amount per unit time upon the rapid increase in the engine speed. As a result, the driver may be less likely to receive a sense of discomfort when the accelerator remains off.

In such a hybrid vehicle of the present disclosure, the setting means may set the permissible charged electricity such that the time period from the beginning of the charging to the beginning of the rapid decrease in the charged electricity is shortened as a temperature of the battery is decreased when the charging is continued, and the predictable condition may be that the temperature of the battery is lower than a specified temperature. In this way, the driver may be less likely to receive the sense of discomfort when the temperature of the battery is lower than the specified temperature and the accelerator remains off.

In the hybrid vehicle of the present disclosure in an aspect in which the permissible charged electricity is set such that the time period from the beginning of the charging to the beginning of the rapid decrease in the charged electricity is shortened as the temperature of the battery is decreased when the battery is continuously charged, the electronic control unit may control the engine such that the motoring of the engine is performed at a higher speed as the temperature of the battery is decreased under the predictable condition until the beginning of the rapid decrease in the charged electricity when the acceleration off control is executed. In this way, it is possible to further suppress the driver from receiving the sense of discomfort in accordance with the temperature of the battery when the temperature of the battery is lower than the specified temperature and the accelerator remains off.

In the hybrid vehicle of the present disclosure, the electronic control unit may control the engine such that the motoring of the engine is performed at the higher speed as a vehicle speed is increased under the predictable condition until the beginning of the rapid decrease in the charged electricity when the acceleration off control is executed. In this way, the engine speed can be decreased along with a decrease in the vehicle speed. Thus, the driver can receive a feeling of deceleration.

In the hybrid vehicle of the present disclosure in the aspect in which the permissible charged electricity is set such that the time period from the beginning of the charging to the beginning of the rapid decrease in the charged electricity is shortened as the temperature of the battery is decreased when the battery is continuously charged, the electronic control unit may set request charged electricity of the battery to be decreased as the temperature of the battery is decreased and to be decreased as the vehicle speed is increased under the predictable condition until the beginning of the rapid decrease in the charged electricity when the acceleration off control is executed, may set target charged electricity of the battery by limiting the request charged electricity by the permissible charged electricity, and may set a target speed of the engine to be increased as the target charged electricity is decreased, so as to control the engine such that the motoring of the engine is performed at the target speed. In this way, by setting the request charged electricity in accordance with the temperature of the battery and the vehicle speed under the predictable condition and setting the target charged electricity and the target speed in accordance with this, the driver may be less likely to receive the sense of discomfort when the accelerator remains off.

In the hybrid vehicle of the present disclosure, the hybrid vehicle may include, as shift positions, a first travel position and a second travel position at which a larger braking force than that at the first travel position is applied to the vehicle during the acceleration off, and the electronic control unit may control the engine such that the motoring of the engine is performed at a speed that corresponds to whether the predictable condition is satisfied until the beginning of the rapid decrease in the charged electricity when the accelerator is off with the shift position being the second travel position and the acceleration off control is executed. Here, it may be set that the first travel position is a drive position (a D position) and the second travel position is a brake position (a B position). In this way, when the shift position is the second travel position (the driver performs a shift operation to the second travel position) and the accelerator remains off, the driver may be less likely to receive the sense of discomfort.

BRIEF DESCRIPTION OF THE DRAWINGS

Exemplary embodiments of the disclosure will be described below with reference to the accompanying drawings, in which like numerals denote like elements, and wherein.

DETAILED DESCRIPTION OF EMBODIMENTS

Next, embodiments of the present disclosure are described.

Figure 1:
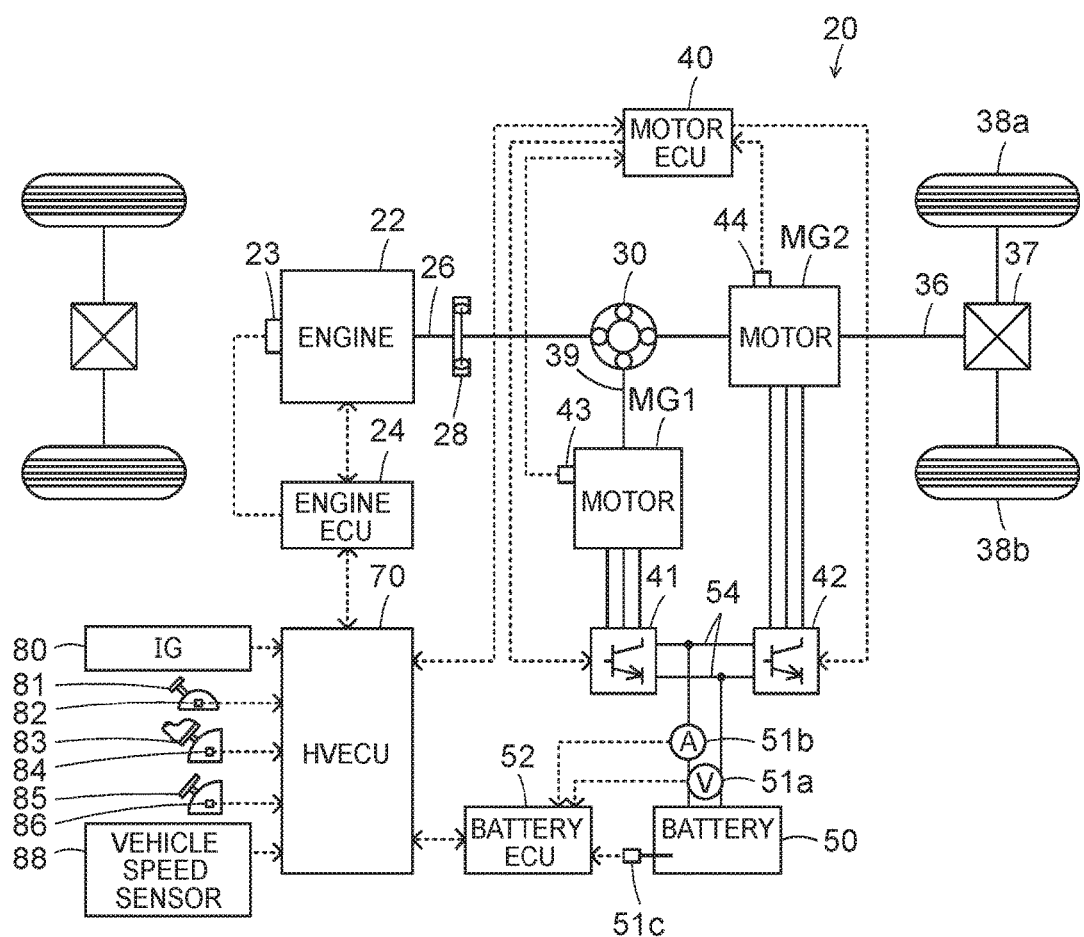
FIG. 1 is a configuration diagram that shows a schematic configuration of a hybrid vehicle 20 as an embodiment of the present disclosure.

FIG. 1 is a configuration diagram that shows a schematic configuration of a hybrid vehicle 20 as the embodiment of the present disclosure. As shown in the drawing, the hybrid vehicle 20 of the embodiment includes an engine 22, a planetary gear 30, motors MG1, MG2, inverters 41, 42, a battery 50, and a hybrid electronic control unit (hereinafter referred to as an "HVECU") 70.

The engine 22 is configured as an internal combustion engine that outputs power by using gasoline, diesel oil, or the like as fuel. An operation of this engine 22 is controlled by an engine electronic control unit (hereinafter referred to as an "engine ECU") 24.

Although not shown, the engine ECU 24 may be configured as a microprocessor that has a CPU as a central component, and may include, in addition to the CPU, a ROM that stores a processing program, a RAM that temporarily stores data, input/output ports, and a communication port. ECU 24 may be programmed to perform one or more of the functions described herein. The engine ECU 24 can receive signals from various sensors that are required for operation control of the engine 22 via the input port. The following may be raised as a signal is received by the engine ECU 24: a crank angle θcr from a crank position sensor 23 that detects a rotational position of a crankshaft 26 of the engine 22; and a throttle opening degree TH from a throttle valve position sensor that detects a position of a throttle valve The engine ECU 24 outputs various control signals for the operation control of the engine 22 via the output port. The following may be raised as a control signal is output from the engine ECU 24: a control signal transmitted to a throttle motor that adjusts the position of the throttle valve; a control signal transmitted to a fuel injection valve; and a control signal transmitted to an ignition coil that is integrated with an igniter.

The engine ECU 24 is connected to the HVECU 70 via the communication port, controls the operation of the engine 22 by a control signal from the HVECU 70, and, when needed, outputs data on an operation state of the engine 22 to the HVECU 70. The engine ECU 24 computes a rotational speed of the crankshaft 26, that is, a speed Ne of the engine 22 on the basis of the crank angle θcr from the crank position sensor 23.

The planetary gear 30 is configured as a planetary gear mechanism of a single pinion type. A rotor of the motor MG1 is connected to a sun gear of the planetary gear 30. A drive shaft 36, which is coupled to drive wheels 38a, 38b via a differential gear 37, is connected to a ring gear of the planetary gear 30. The crankshaft 26 of the engine 22 is connected to a carrier of the planetary gear 30 via a damper 28.

The motor MG1 is configured as a synchronous generator motor, for example, and the rotor thereof is connected to the sun gear of the planetary gear 30 as described above. The motor MG2 is configured as a synchronous generator motor, for example, and a rotor thereof is connected to the drive shaft 36. The inverters 41, 42 are each connected to the battery 50 via an electricity line 54. A motor electronic control unit (hereinafter referred to as a "motor ECU") 40 executes switching control of plural unillustrated switching elements of the inverters 41, 42, and, in this way, the motors MG1, MG2 are rotationally driven.

Although not shown, the motor ECU 40 may be configured as a microprocessor that has a CPU as a central component, and may include, in addition to the CPU, a ROM that stores a processing program, a RAM that temporarily stores data, input/output ports, and a communication port. The motor ECU 40 can receive signals from various sensors that are required for drive control of the motors MG1, MG2 via the input port. The following can be raised as a signal is received by the motor ECU 40: rotational positions θm1, θm2 from rotational position detection sensors 43, 44 that respectively detect rotational positions of the rotors of the motors MG1, MG2; and a phase current from a current sensor that detects a current flowing through each phase of each of the motors MG1, MG2

The motor ECU 40 may output switching control signals, which are transmitted to the plural unillustrated switching elements of the inverters 41, 42, and the like via the output port. The motor ECU 40 is connected to the HVECU 70 via the communication port, executes the drive control of the motors MG1, MG2 by a control signal from the HVECU 70, and, when needed, outputs data on drive states of the motors MG1, MG2 to the HVECU 70. The motor ECU 40 computes rotational speeds Nm1, Nm2 of the motors MG1, MG2 on the basis of the rotational positions θm1, θm2 of the rotors of the motors MG1, MG2 from the rotational position detection sensors 43, 44.

The battery 50 is configured as a lithium-ion secondary battery. As described above, this battery 50 is connected to each of the inverters 41, 42 via the electricity line 54. The battery 50 is managed by a battery electronic control unit (hereinafter referred to as a "battery ECU") 52.

Although not shown, the battery ECU 52 is configured as a microprocessor that has a CPU as a central component, and may include, in addition to the CPU, a ROM that stores a processing program, a RAM that temporarily stores data, input/output ports, and a communication port. The battery ECU 52 can receive signals from various sensors that are required to manage the battery 50 via the input port. The following can be raised as the a signal is received by the battery ECU 52: a battery voltage Vb from a voltage sensor 51a that is installed between terminals of the battery 50; a battery current Ib from a current sensor 51b that is attached to the output terminal of the battery 50 (having a positive value when being discharged from the battery 50); and a battery temperature Tb from a temperature sensor 51c that is attached to the battery 50

The battery ECU 52 is connected to the HVECU 70 via the communication port and, upon necessary, outputs data on a state of the battery 50 to the HVECU 70. The battery ECU 52 computes an electricity accumulation ratio SOC on the basis of an integrated value of the battery current Ib from the current sensor 51b. The electricity accumulation ratio SOC is a ratio of a capacity of the electricity that can be discharged from the battery 50 to a total capacity of the battery 50. The battery ECU 52 also computes an input limit Win and an output limit Wout of the battery 50. The input limit Win is a permissible amount of electricity that may be charged in the battery 50, and the output limit Wout is permissible discharge electricity that may be discharged from the battery 50.

Although not shown, the HVECU 70 is configured as a microprocessor that has a CPU as a central component, and may include, in addition to the CPU, a ROM that stores a processing program, a RAM that temporarily stores data, input/output ports, and a communication port. The HVECU 70 can receive signals from various sensors via the input port. The following can be raised as a signal is received by the HVECU 70: an ignition signal from an ignition switch 80; a shift position SP from a shift position sensor 82 that detects an operation position of a shift lever 81; an accelerator pedal operation amount Acc from an accelerator pedal position sensor 84 that detects a depression amount of an accelerator pedal 83; a brake pedal position BP from a brake pedal position sensor 86 that detects a depression amount of a brake pedal 85; and a vehicle speed V from a vehicle speed sensor 88.

As described above, the HVECU 70 is connected to the engine ECU 24, the motor ECU 40, and the battery ECU 52 via the communication ports and transmits/receives the various control signals and data to/from the engine ECU 24, the motor ECU 40, and the battery ECU 52.

Note that as the operation positions of the shift lever 81 (the shift positions SP that are detected by the shift position sensor 82), a parking position used during parking (a P position), a reverse position for a reverse travel (an R position), a neutral position (an N position), a drive position for a forward travel (a D position), a brake position at which a larger braking force than that at the D position is applied to the vehicle when the accelerator is off (a B position), and the like are prepared in the hybrid vehicle 20 of the embodiment.

In the hybrid vehicle 20 of the embodiment that is configured as described above, first, request torque Tr* that is requested for a travel (requested to the drive shaft 36) is set on the basis of the shift position SP, the accelerator pedal operation amount Acc, and the vehicle speed V. Then, the engine 22 and the motors MG1, MG2 are controlled such that the engine 22 is operated or stops being operated, that charge/discharge electricity Pb (=Vb·Ib) of the battery 50 falls within ranges of the input and output limits Win, Wout, and that torque based on the request torque Tr* is output to the drive shaft 36.

Figure 2:
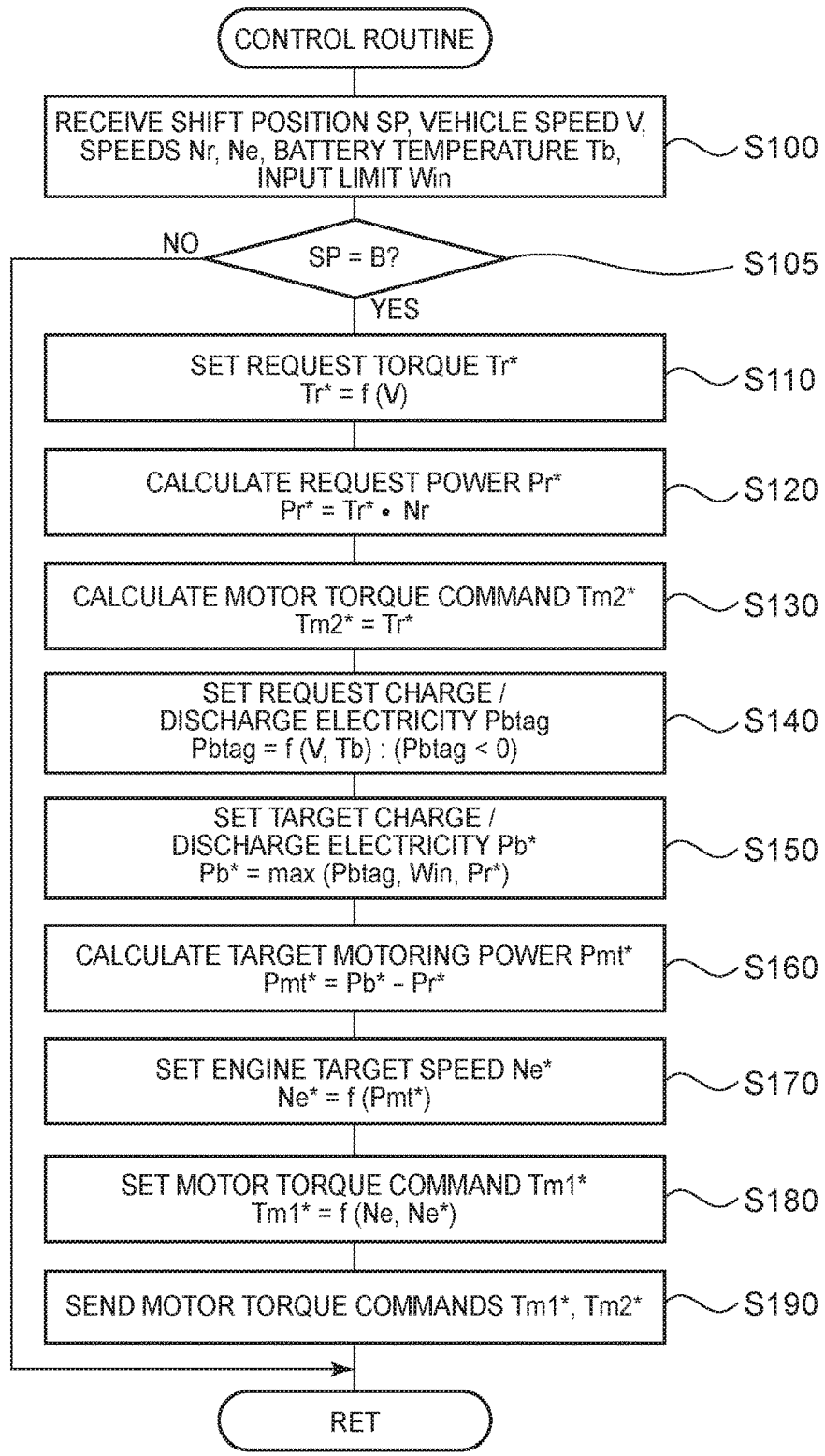
FIG. 2 is a flowchart of one example of a control routine that is repeatedly executed by an HVECU 70 of the embodiment when an accelerator is off.

Next, a description will be made on an operation of the hybrid vehicle 20 of the embodiment that is configured as described above and particularly on an operation thereof at a time when the shift position SP is shifted to the B position, the accelerator is turned off (the accelerator pedal operation amount Acc obtains a value 0), and the braking force is applied to the vehicle during the forward travel. FIG. 2 is a flowchart of one example of a control routine that is repeatedly executed by the HVECU 70 of the embodiment when the accelerator is off.

When the control routine in FIG. 2 is executed, the HVECU 70 first receives the data that includes the shift position SP, the vehicle speed V, a rotational speed Nr of the drive shaft 36, the speed Ne of the engine 22, the battery temperature Tb, the input limit Win of the battery 50, and the like (step S100). Here, as the shift position SP, a value that is detected by the shift position sensor 82 is received. As the vehicle speed V, a value that is detected by the vehicle speed sensor 88 is received. In addition, as the rotational speed Nr of the drive shaft 36, the rotational speed Nm2 of the motor MG2 that is computed by the motor ECU 40 is received through the communication. As the speed Ne of the engine 22, a value that is computed by the engine ECU 24 is received through the communication. As the battery temperature Tb, a value that is detected by the temperature sensor 51c is received from the battery ECU 52 through the communication. As the input limit Win of the battery 50, a value that is computed by the battery ECU 52 is received through the communication.

Here, the input limit Win of the battery 50 will be described. The battery ECU 52 sets the input limit Win of the battery 50 within a range that is at most equal to a value 0 on the basis of the battery temperature Tb, the electricity accumulation ratio SOC, and the charge/discharge electricity Pb (=Vb·Ib) at a time when the battery 50 is continuously charged.

First, a description will be made on a relationship between the input limit Win and each of the battery temperature Tb and the electricity accumulation ratio SOC. In this relationship, the input limit Win is set to be increased (decreased as a value on a charging side) as the battery temperature Tb is decreased, and to be increased (decreased as the value on the charging side) as the electricity accumulation ratio SOC is increased. More specifically, the input limit Win is set to be increased as the battery temperature Tb is decreased, and to be increased as the electricity accumulation ratio SOC is increased. This is due to a temperature characteristic and an electricity accumulation ratio characteristic of the battery 50.

Figure 3:
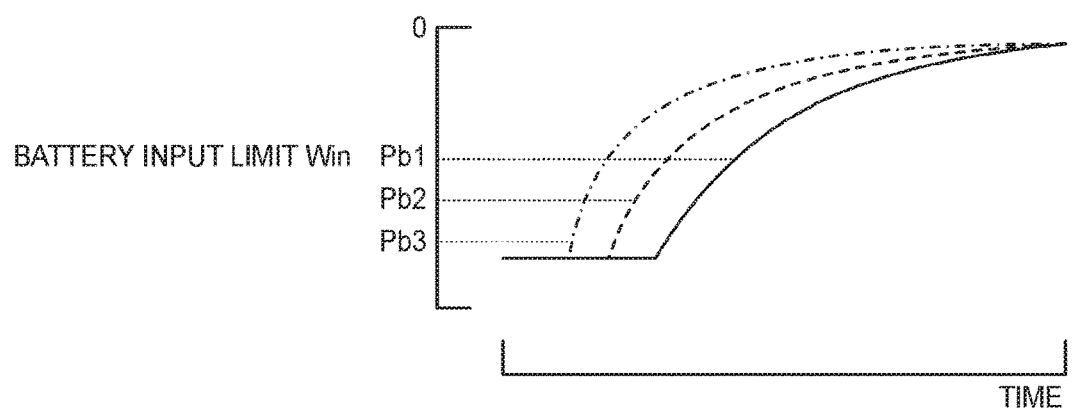
FIG. 3 is an explanatory chart that shows one example of a relationship between charge/discharge electricity Pb (a charge/discharge current Ib) and an input limit Win at a time when a battery 50 is continuously charged.

Next, a description will be made on a relationship between the charge/discharge electricity Pb and the input limit Win at the time when the battery 50 is continuously charged. FIG. 3 is an explanatory chart that shows one example of this relationship. In the chart, a solid line, a broken line, and a one-dot chain line respectively show states of the input limit Win in the case where the charge/discharge electricity Pb at a time when the battery temperature Tb is a uniform temperature and the battery 50 starts being charged is electricity Pb1, Pb2, and Pb3 (Pb3<Pb2<Pb1<0). Note that, in this chart, electricity that is obtained by limiting the electricity Pb1, Pb2, Pb3 by the input limit Win (that is subjected to a lower limit guard) corresponds to the charge/discharge electricity Pb. In this relationship, as shown in FIG. 3, when the charge/discharge electricity Pb is low (high as the value on the charging side), the input limit Win is set such that a time period from beginning of charging of the battery 50 to beginning of a rapid increase in the charge/discharge electricity Pb (a rapid decrease as the value on the charging side) is shortened and that an increase amount per unit time (a decrease amount as the value on the charging side) at the beginning of the rapid increase in the charge/discharge electricity Pb is increased in comparison with a case where the charge/discharge electricity Pb is high. This is conducted to suppress precipitation of lithium from the battery 50 and the like and to suppress deterioration of the battery 50 from being promoted in accordance with history at the time when the battery 50 is continuously charged (an integrated value of the charge/discharge electricity Pb (the charge/discharge current Ib)). Note that the "rapid increase (rapid decrease)" means that the increase amount (the decrease amount) per unit time is larger than a specified increase amount (a specified decrease amount).

Figure 4:
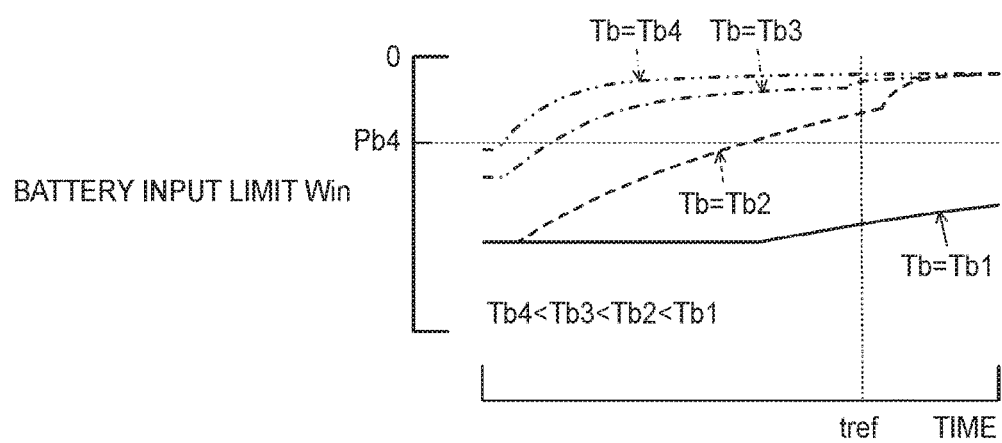
FIG. 4 is an explanatory chart that shows one example of a relationship between a battery temperature Tb and the input limit Win at the time when the battery 50 is continuously charged.

Furthermore, a description will be made on a relationship between the battery temperature Tb and the input limit Win at the time when the battery 50 is continuously charged. FIG. 4 is an explanatory chart that shows one example of this relationship. In the chart, a solid line, a broken line, a one-dot chain line, and a two-dot chain line respectively show states of the input limit Win in the cases where the charge/discharge electricity Pb at the time when the battery 50 starts being charged is uniform electricity Pb4 (Pb4<0) and the battery temperatures Tb are temperatures Tb1, Tb2, Tb3, Tb4 (Tb1>Tb2>Tb3>Tb4). Note that, similar to FIG. 3, electricity that is obtained by limiting the electricity Pb4 by the input limit Win (that is subjected to the lower limit guard) corresponds to the charge/discharge electricity Pb in this chart. In this relationship, the input limit Win is set such that the time period from the beginning of the charging of the battery 50 to the beginning of the rapid increase in the charge/discharge electricity Pb (the rapid decrease as the value on the charging side) is shortened as the battery temperature Tb is decreased. This is conducted to suppress the precipitation of lithium from the battery 50 and the like and to suppress the deterioration of the battery 50 from being promoted in accordance with the battery temperature Tb at the time when the battery 50 is continuously charged.

Once the data is received as described above, it is determined whether the shift position SP is the B position (step S105). If the shift position SP is the B position, the request torque Tr* that is requested to the vehicle is set on the basis of the vehicle speed V (step S110). Here, in the embodiment, a relationship between the vehicle speed V and the request torque Tr* is defined in advance and stored as a request torque setting map in the ROM, which is not shown. Then, when the vehicle speed V is provided, the request torque Tr* is set by deriving the corresponding request torque Tr* from this map. Because a situation where the accelerator is turned off and the braking force is applied to the vehicle is considered at this time, a negative value (a value on a braking side) is set for the request torque Tr*. The request torque Tr* is set to be lower (higher as the value on the braking side) at a time when the shift position SP is the B position and the accelerator is off than that at a time when the shift position SP is the D position and the accelerator is off, and set to be decreased as the vehicle speed V is increased.

Next, request power Pr* that is requested to the vehicle is calculated by multiplying the request torque Tr* by the rotational speed Nr of the drive shaft 36 (step S120), and the request torque Tr* is set in a torque command Tm2* of the motor MG2 (step S130). Because a situation where the forward travel is made (a situation where the rotational speed Nr of the drive shaft 36 is positive) is considered at this time, similar to the request torque Tr*, the request power Pr* also has a negative value.

Figure 5:
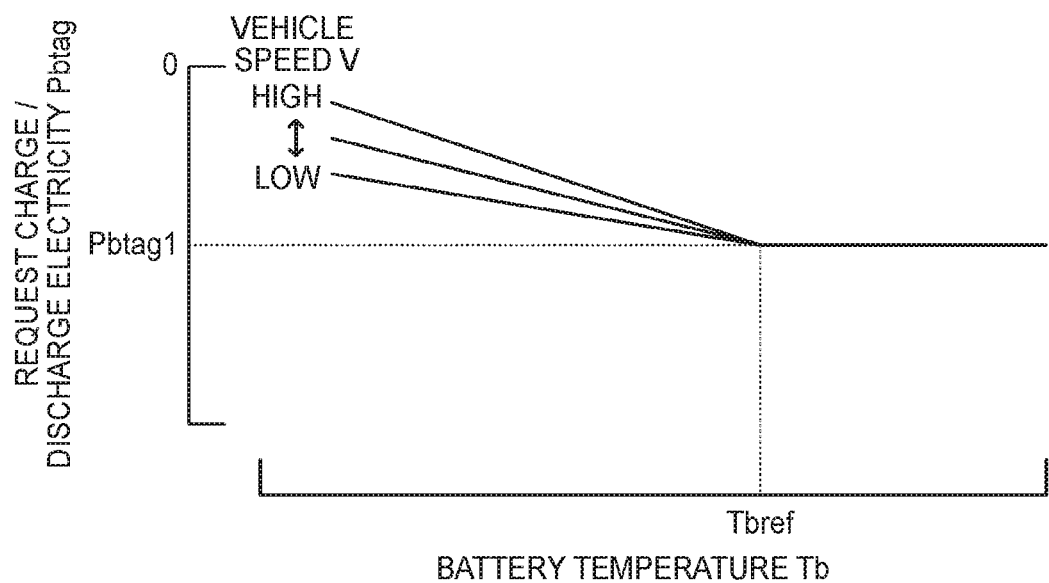
FIG. 5 is an explanatory chart that shows one example of a request charge/discharge electricity setting map.

Then, request charge/discharge electricity Pbtag of the battery 50 is set to fall within a range that is lower than the value 0 (a range within which the battery 50 is charged) on the basis of the battery temperature Tb and the vehicle speed V (step S140), and target charge/discharge electricity Pb* of the battery 50 is set by limiting the thus-set request charge/discharge electricity Pbtag by the input limit Win and the request power Pr* (being subjected to the lower limit guard) (step S150). Here, in the embodiment, a relationship among the battery temperature Tb, the vehicle speed V, and the request charge/discharge electricity Pbtag is defined in advance and stored as a request charge/discharge electricity setting map in the ROM, which is not shown. Thus, when the battery temperature Tb and the vehicle speed V are received, the request charge/discharge electricity Pbtag is set by deriving the corresponding request charge/discharge electricity Pbtag from this map. One example of the request charge/discharge electricity setting map is shown in FIG. 5. As shown in the chart, when the battery temperature Tb is at least equal to a threshold Tbref, specified negative electricity Pbtag1 is set for the request charge/discharge electricity Pbtag regardless of the battery temperature Tb and the vehicle speed V. In addition, when the battery temperature Tb is lower than the threshold Tbref, the request charge/discharge electricity Pbtag is set to be increased (decreased as the value on the charging side) as the battery temperature Tb is decreased, and to be increased (decreased as the value on the charging side) as the vehicle speed V is increased within a range that is lower than the value 0 and is higher than the specified electricity Pbtag1, and, more specifically, is set to be increased as the battery temperature Tb is decreased and to be increased as the vehicle speed V is increased. Here, the threshold Tbref is an upper limit of a range of the battery temperature Tb within which the time period from the beginning of the charging of the battery 50 to the beginning of the rapid increase (the rapid decrease as the value on the charging side) in the charge/discharge electricity Pb is predicted to be within a specified time period tref (see FIG. 4, from several tens of seconds to approximately one minute or the like, for example) when the accelerator is off with the shift position SP being the B position, and, for example, 20° C., 22° C., 25° C., or the like can be used therefor. A reason, why the relationship among the battery temperature Tb, the vehicle speed V, and the request charge/discharge electricity Pbtag is defined as described above at the time when the battery temperature Tb is lower than the threshold Tbref, will be described below. Note that, because a situation where the shift position SP is the B position is considered at this time, the request power Pr* is set to be lower (higher as the value on the braking side) than the request charge/discharge electricity Pbtag regardless of the battery temperature Tb.

Figure 6:
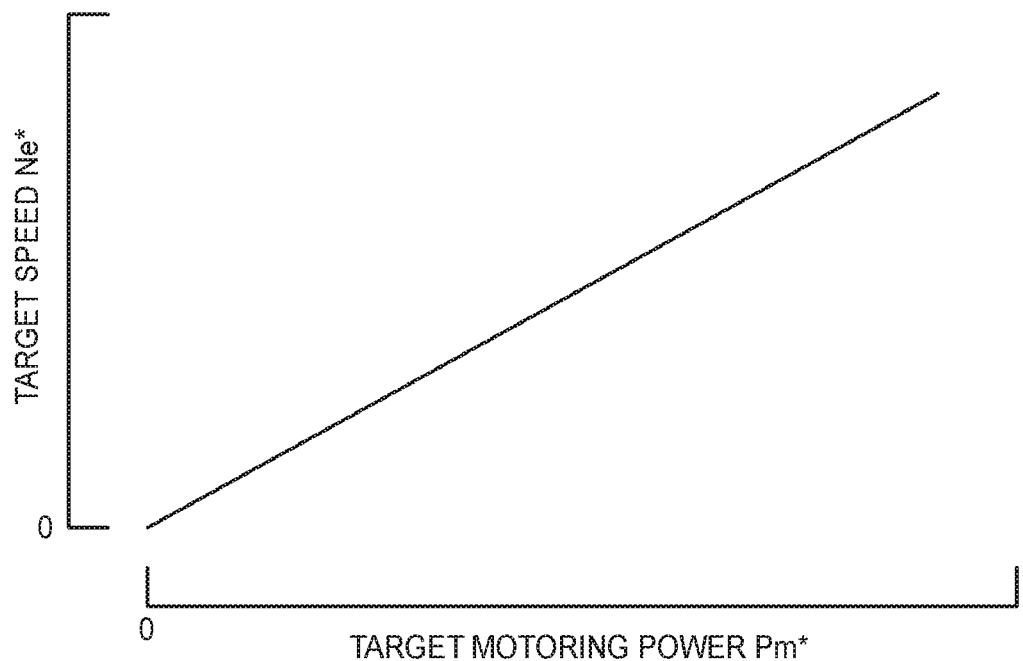
FIG. 6 is an explanatory chart that shows one example of a target speed setting map.

Once the target charge/discharge electricity Pb* of the battery 50 is set as described above, a value that is obtained by subtracting the request power Pr* from the thus-set target charge/discharge electricity Pb* is set as target motoring power Pmt* (step S160), and a target speed Ne* of the engine 22 is set on the basis of the set target motoring power Pmt* (step S170). Here, the target motoring power Pmt* is a target value of consumed power (consumed electricity) at a time when the motoring of the engine 22, which is in a state where fuel injection is stopped, is performed by the motor MG1. In addition, in the embodiment, a relationship between the target motoring power Pmt* and the target speed Ne* of the engine 22 is defined in advance and stored as a target speed setting map. Then, when the target motoring power Pmt* is received, the target speed Ne* of the engine 22 is set by deriving the corresponding target speed Ne* from this map. One example of the target speed setting map is shown in FIG. 6. The target speed Ne* of the engine 22 is set to be increased as the target motoring power Pmt* is increased. This is because friction of the engine 22 is increased and the consumed electricity by the motor MG1 is increased as the speed Ne of the engine 22 is increased. As described above, the request power Pr* is set to be lower (higher as the value on the braking side) than the request charge/discharge electricity Pbtag regardless of the battery temperature Tb. Thus, the target motoring power Pmt* and the target speed Ne* of the engine 22 each obtain a value that is higher than the value 0.

Now, a situation where the request charge/discharge electricity Pbtag is set as the target charge/discharge electricity Pb* and the request power Pr* is constant is considered. Here, the time period from the beginning of the charging of the battery 50 to the beginning of the rapid increase (the rapid decrease as the value on the charging side) in the charge/discharge electricity Pb of the battery 50 basically corresponds to a time period in which the request charge/discharge electricity Pbtag is set as the target charge/discharge electricity Pb*. In the embodiment, as described above, when the battery temperature Tb is at least equal to the threshold Tbref, the specified negative electricity Pbtag1 is set as the request charge/discharge electricity Pbtag regardless of the battery temperature Tb and the vehicle speed V. Meanwhile, when the battery temperature Tb is lower than the threshold Tbref, the request charge/discharge electricity Pbtag is set to be increased (decreased as the value on the charging side) as the battery temperature Tb is decreased, and to be increased (decreased as the value on the charging side) as the vehicle speed V is increased, within a range that is lower than the value 0 and higher than the specified electricity Pbtag1. Accordingly, when the battery temperature Tb is at least equal to the threshold Tbref, the target motoring power Pmt* becomes constant, and the target speed Ne* of the engine 22 becomes constant regardless of the battery temperature Tb and the vehicle speed V. In addition, when the battery temperature Tb is lower than the threshold Tbref, the target motoring power Pmt* and the target speed Ne* of the engine 22 become higher than those at the time when the battery temperature Tb is at least equal to the threshold Tbref. Furthermore, at this time, the target motoring power Pmt* and the target speed Ne* of the engine 22 are increased as the battery temperature Tb is decreased. In addition, the target motoring power Pmt* and the target speed Ne* of the engine 22 are increased as the vehicle speed V is increased.

Furthermore, a situation where the input limit Win of the battery 50 is set as the target charge/discharge electricity Pb* and the request power Pr* is constant is considered. Here, a time period after the beginning of the rapid increase (the rapid decrease as the value on the charging side) in the charge/discharge electricity Pb of the battery 50 basically corresponds to a time period in which the input limit Win is set as the target charge/discharge electricity Pb*. At this time, the target motoring power Pmt* and the target speed Ne* of the engine 22 are set in accordance with the input limit Win. Accordingly, the target speed Ne* of the engine 22 is increased as the input limit Win is increased (decreased as the value on the charging side).

Once the target speed Ne* of the engine 22 is set as described above, a torque command Tm1* of the motor MG1 is set by the following expression (1) using the speed Ne and the target speed Ne* of the engine 22 (step S180). Here, the expression (1) is a relational expression in speed feedback control for rotating the engine 22 at the target speed Ne*. In the expression (1), "k1" in the first term on a right side refers to a gain of a proportional term, and "k2" in the second term on the right side refers to a gain of an integration term.

$$Tm1^* = k1 \cdot (Ne^* - Ne) + k2 \cdot \int (Ne^* - Ne) dt \quad (1)$$

Then, when the torque commands Tm1*, Tm2* of the motors MG1, MG2 are set, the set torque commands Tm1*, Tm2* are sent to the motor ECU 40 (step S190), and this routine is terminated. When receiving the torque commands Tm1*, Tm2* of the motors MG1, MG2, the motor ECU 40 executes the switching control of the switching elements of the inverters 41, 42 such that the motors MG1, MG2 are respectively driven by the torque commands Tm1*, Tm2*.

By executing such control, when the accelerator is off with the shift position SP being the B position, the braking force can be applied to the vehicle while the battery 50 is charged within the range of the input limit Win of the battery 50 by regenerative drive of the motor MG2 and motoring of the engine 22, which is in the state where fuel injection is stopped, by the motor MG1. Note that, at this time, torque applied to the drive shaft 36 corresponds to a sum of torque applied to the drive shaft 36 by the regenerative drive of the motor MG2 and torque applied to the drive shaft 36 by motoring of the engine 22 by the motor MG1. However, because the latter torque is basically much lower than the former torque (for example, approximately one tenth to one twentieth thereof), the request torque Tr* is set in the torque command Tm2* in the embodiment.

In addition, when the battery temperature Tb is lower than the threshold Tbref, the request charge/discharge electricity Pbtag becomes higher (lower as the value on the charging side) than that at the time when the battery temperature Tb is at least equal to the threshold Tbref, so as to increase the target charge/discharge electricity Pb*, the target motoring power Pmt*, and the target speed Ne* of the engine 22 in the time period from the beginning of the charging of the battery 50 to the beginning of the rapid increase (the rapid decrease as the value on the charging side) in the charge/discharge electricity Pb of the battery 50. In this way, when the battery temperature Tb is lower than the threshold Tbref, the consumed electricity by the motor MG1 until the beginning of the rapid increase in the charge/discharge electricity Pb of the battery 50 is increased, and the charge/discharge electricity Pb of the battery 50 is increased (decreased as the value on the charging side). As described above, the input limit Win is set such that the time period from the beginning of the charging of the battery 50 to the beginning of the rapid increase (the rapid decrease as the value on the charging side) in the charge/discharge electricity Pb is shortened and the increase amount (the decrease amount as the value on the charging side) per unit time at the beginning of the rapid increase in the charge/discharge electricity Pb is increased when the charge/discharge electricity Pb is low (high as the value on the charging side) in comparison with the case where the charge/discharge electricity Pb is high. Accordingly, the following effects can be exerted by increasing the charge/discharge electricity Pb of the battery 50 (decreasing as the value on the charging side) until the beginning of the rapid increase in the charge/discharge electricity Pb of the battery 50 when the battery temperature Tb is lower than the threshold Tbref. Firstly, it is possible to suppress shortening of a time period until the beginning of the rapid increase (the rapid decrease as the value on the charging side) in the charge/discharge electricity Pb of the battery 50, and is also possible to suppress shortening of a time period until beginning of a rapid increase in the speed Ne of the engine 22. Secondly, it is possible to suppress a rise in increase amount (decrease amount as the value on the charging side) per unit time at the beginning of the rapid increase in the charge/discharge electricity Pb of the battery 50, and is also possible to suppress a rise in increase amount per unit time at beginning of the rapid increase in the speed Ne of the engine 22. As the results of these, it is possible to suppress a driver from receiving a sense of discomfort when the shift position SP is the B position (the driver performs a shift operation to the B position) and the accelerator remains off.

Next, a description will be made on a reason why the request charge/discharge electricity Pbtag is set to be increased (decreased as the value on the charging side) as the battery temperature Tb is decreased and to be increased (decreased as the value on the charging side) as the vehicle speed V is increased when the battery temperature Tb is lower than the threshold Tbref.

First, a description will be made on a relationship between the battery temperature Tb and the request charge/discharge electricity Pbtag at the time when the battery temperature Tb is lower than the threshold Tbref. As described above, the input limit Win is set such that the time period from the beginning of the charging of the battery 50 to the beginning of the rapid increase (the rapid decrease as the value on the charging side) in the charge/discharge electricity Pb is shortened as the battery temperature Tb is decreased. Accordingly, as shown in FIG. 5, when the request charge/discharge electricity Pbtag is set to be increased as the battery temperature Tb is decreased, it is possible to suppress shortening of the time period until the beginning of the rapid increase (the rapid decrease as the value on the charging side) in the charge/discharge electricity Pb of the battery 50, and is possible to suppress shortening of the time period until the beginning of the rapid increase in the speed Ne of the engine 22. As a result, it is possible to further appropriately suppress the driver from receiving the sense of discomfort in accordance with the battery temperature Tb when the shift position SP is the B position (the driver performs the shift operation to the B position) and the accelerator remains off.

Next, a description will be made on a relationship between the vehicle speed V and the request charge/discharge electricity Pbtag at the time when the battery temperature Tb is lower than the threshold Tbref. In the embodiment, as shown in FIG. 5, the request charge/discharge electricity Pbtag is set to be increased (decreased as the value on the charging side) as the vehicle speed V is increased. In this way, the target charge/discharge electricity Pb*, the target motoring power Pmt*, and the target speed Ne* of the engine 22 are increased. Accordingly, the target speed Ne* (the speed Ne) of the engine 22 is decreased along with a decrease in the vehicle speed V when the accelerator remains off. Thus, the driver can receive a feeling of deceleration.

If the shift position SP is the D position in step S105, this routine is terminated as is. When the accelerator is off with the shift position SP being the D position, the request torque Tr* is higher (lower as the value on the braking side) and the request power Pr* is higher (lower as the value on the braking side) than those at the time when the accelerator is off with the shift position SP being the B position. A value in such a magnitude that the time period from the beginning of the charging of the battery 50 to the beginning of the rapid increase (the rapid decrease as the value on the charging side) in the charge/discharge electricity Pb is not predicted to be within the specified time period tref even at the time when the battery temperature Tb is lower than the threshold Tbref is set for the request torque Tr* (the request power Pr*). Accordingly, in the embodiment, the braking force is applied to the vehicle while the battery 50 is charged by the regenerative drive of the motor MG2 with the electricity that corresponds to the request power Pr*.

Figure 7:
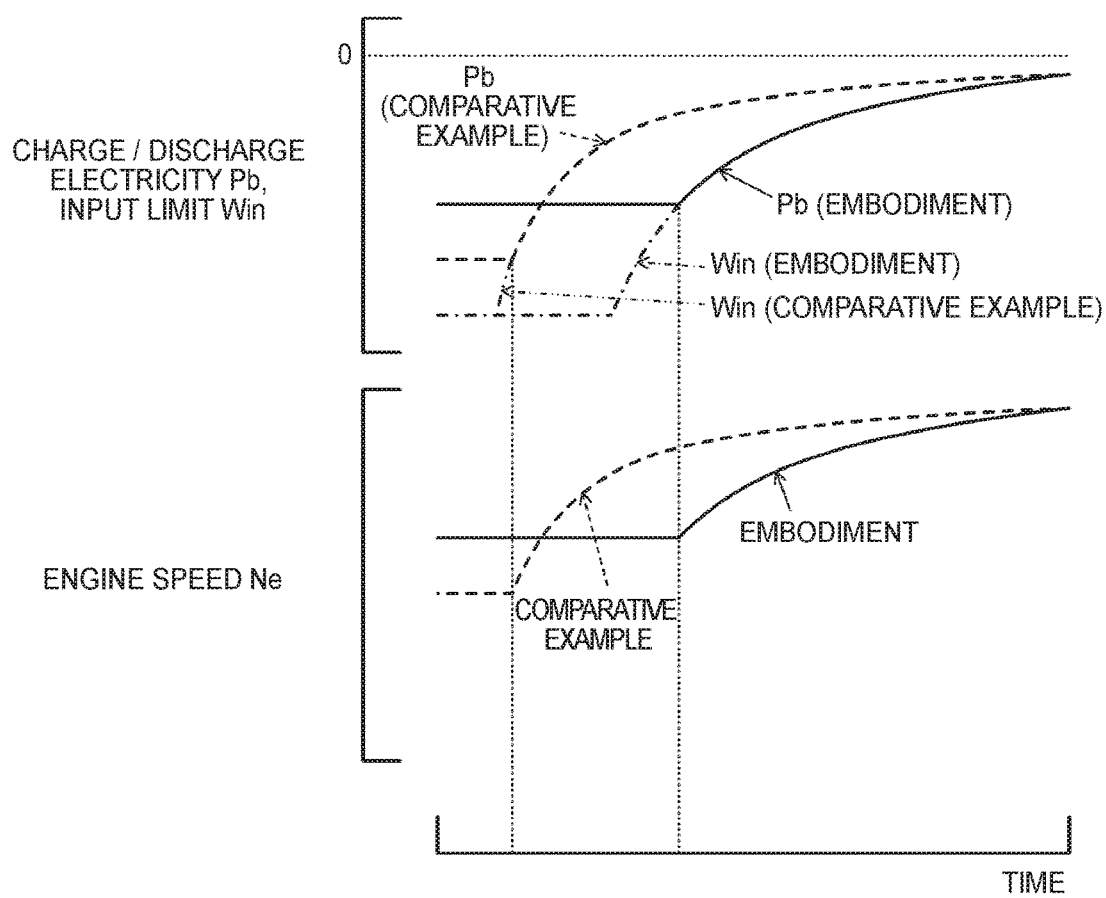
FIG. 7 is an explanatory chart that shows one example of states of temporal changes in the charge/discharge electricity Pb and the input limit Win of the battery 50 and a speed Ne of an engine 22 at a time when the accelerator is off with a shift position SP being a B position and the battery temperature Tb is lower than a threshold Tbref.

FIG. 7 is an explanatory chart that shows one example of states of temporal changes in the charge/discharge electricity Pb and the input limit Win of the battery 50 and the speed Ne of the engine 22 at the time when the accelerator is off with the shift position SP being the B position and the battery temperature Tb is lower than the threshold Tbref. In the chart, solid lines indicate the state in the embodiment, and broken lines indicate a state in a comparative example. As the comparative example, a case where the charge/discharge electricity Pb at the time when the battery temperature Tb is at least equal to the threshold Tbref and the charge/discharge electricity Pb at the time when the battery 50 starts being charged, that is, the target speeds Ne* (the speeds Ne) of the engine 22 at these times are set to be the same will be considered. Different from the comparative example, in the embodiment, the speed Ne of the engine 22 at the time when the battery 50 starts being charged is increased to be higher than that at the time when the battery temperature Tb is at least equal to the threshold Tbref, so as to increase (decrease as the value on the charging side) the charge/discharge electricity Pb from the beginning of the charging of the battery 50 to the beginning of the rapid increase (the rapid decrease as the value on the charging side) in the charge/discharge electricity Pb of the battery 50. Accordingly, it is possible to suppress shortening of the time period until the beginning of the rapid increase (the rapid decrease as the value on the charging side) in the charge/discharge electricity Pb of the battery 50, and is possible to suppress shortening of the time period until the beginning of the rapid increase in the speed Ne of the engine 22. In addition, it is possible to suppress the rise in increase amount (decrease amount as the value on the charging side) per unit time at the beginning of the rapid increase in the charge/discharge electricity Pb of the battery 50, and is possible to suppress the rise in increase amount per unit time at the beginning of the rapid increase in the speed Ne of the engine 22. As the results of these, it is possible to suppress the driver from receiving the sense of discomfort when the shift position SP is the B position (the driver performs the shift operation to the B position) and the accelerator remains off.

In the hybrid vehicle 20 of the embodiment that has been described so far, when the accelerator is off with the shift position SP being the B position, the braking force is applied to the vehicle while the battery 50 is charged within the range of the input limit Win of the battery 50 by the regenerative drive of the motor MG2 and motoring of the engine 22, which is in the state where the fuel injection is stopped, by the motor MG1. Then, at this time, when the battery temperature Tb is lower than the threshold Tbref, the request charge/discharge electricity Pbtag is increased (decreased as the value on the charging side) to be higher than that at the time when the battery temperature Tb is at least equal to the threshold Tbref, so as to increase the target charge/discharge electricity Pb*, the target motoring power Pmt*, and the target speed Ne* (the speed Ne) of the engine 22 from the beginning of the charging of the battery 50 to the beginning of the rapid increase (the rapid decrease as the value on the charging side) in the charge/discharge electricity Pb of the battery 50. In this way, when the battery temperature Tb is lower than the threshold Tbref, the consumed electricity by the motor MG1 until the beginning of the rapid increase in the charge/discharge electricity Pb of the battery 50 is increased, so as to increase (decrease as the value on the charging side) the charge/discharge electricity Pb of the battery 50. Accordingly, it is possible to suppress shortening of the time period until the beginning of the rapid increase (the rapid decrease as the value on the charging side) in the charge/discharge electricity Pb of the battery 50, and is possible to suppress shortening of the time period until the beginning of the rapid increase in the speed Ne of the engine 22. In addition, it is possible to suppress the rise in increase amount (decrease amount as the value on the charging side) per unit time at the beginning of the rapid increase in the charge/discharge electricity Pb of the battery 50, and is also possible to suppress the rise in increase amount per unit time at the beginning of the rapid increase in the speed Ne of the engine 22. As the results of these, it is possible to suppress the driver from receiving the sense of discomfort when the shift position SP is the B position (the driver performs the shift operation to the B position) and the accelerator remains off.

In the hybrid vehicle 20 of the embodiment, when the accelerator is off with the shift position SP being the B position and the battery temperature Tb is lower than the threshold Tbref, the request charge/discharge electricity Pbtag of the battery 50 is set in accordance with the battery temperature Tb and the vehicle speed V so as to become lower than the value 0 and to fall within the range that is higher than the range at the time when the battery temperature Tb is at least equal to the threshold Tbref. However, when the battery temperature Tb is lower than the threshold Tbref, the request charge/discharge electricity Pbtag of the battery 50 may be set in accordance with either the battery temperature Tb or the vehicle speed V, or a uniform value may be used therefor regardless of the battery temperature Tb and the vehicle speed V, as long as the request charge/discharge electricity Pbtag of the battery 50 is set to become lower than the value 0 and to fall within the range that is higher than the range at the time when the battery temperature Tb is at least equal to the threshold Tbref.

Figure 8:
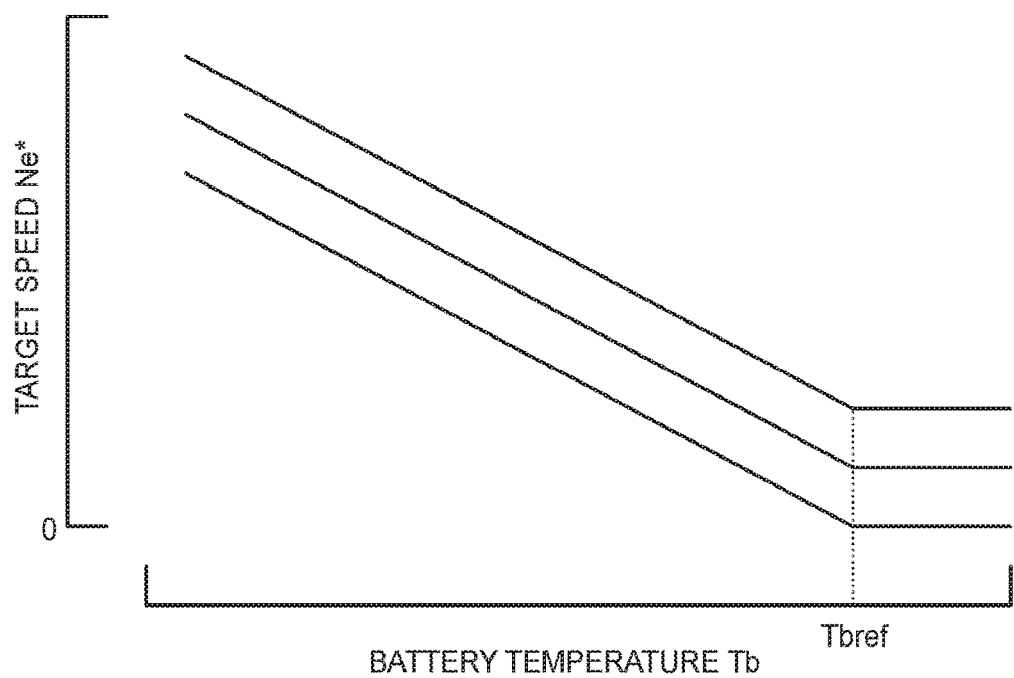
FIG. 8 is an explanatory chart that shows one example of a target speed setting map.

In the hybrid vehicle 20 of the embodiment, when the accelerator is off with the shift position SP being the B position and the battery temperature Tb is lower than the threshold Tbref, the request charge/discharge electricity Pbtag is increased (decreased as the value on the charging side) to be higher than that at the time when the battery temperature Tb is at least equal to the threshold Tbref, so as to increase the target charge/discharge electricity Pb*, the target motoring power Pmt*, and the target speed Ne* of the engine 22 from the beginning of the charging of the battery 50 to the beginning of the rapid increase (the rapid decrease as the value on the charging side) in the charge/discharge electricity Pb of the battery 50. However, in the time period from the beginning of the charging of the battery 50 to the beginning of the rapid increase (the rapid decrease as the value on the charging side) in the charge/discharge electricity Pb of the battery 50, when the accelerator is off with the shift position SP being the B position and the battery temperature Tb is lower than the threshold Tbref, the request charge/discharge electricity Pbtag may not be set, but the target speed Ne* of the engine 22 may directly be set such that the target speed Ne* of the engine 22 becomes higher than that at the time when the battery temperature Tb is at least equal to the threshold Tbref and that the charge/discharge electricity Pb of the battery 50 falls within the range of the input limit Win. In this case, for example, a relationship among the request torque Tr*, the battery temperature Tb, and the target speed Ne* of the engine 22 is defined in advance and stored as a target speed setting map of a modified example in the ROM, which is not shown. In this way, the target speed Ne* of the engine 22 from the beginning of the charging of the battery 50 to the beginning of the rapid increase (the rapid decrease as the value on the charging side) in the charge/discharge electricity Pb of the battery 50 can be set by deriving the corresponding target speed Ne* from this map when the request torque Tr* and the battery temperature Tb are received. One example of the target speed setting map of the modified example is shown in FIG. 8. As shown in the chart, when the battery temperature Tb is at least equal to the threshold Tbref and the request torque Tr* is low (high as the value on the braking side), the target speed Ne* of the engine 22 can be set to be higher than that at the time when the request torque Tr* is high. More specifically, the target speed Ne* of the engine 22 can be set to be increased as the request torque Tr* is decreased. In addition, when the battery temperature Tb is lower than the threshold Tbref and the request torque Tr* is low (high as the value on the braking side), the target speed Ne* of the engine 22 can be set to be higher than that at the time when the request torque Tr* is high and to be increased as the battery temperature Tb is decreased. More specifically, the target speed Ne* of the engine 22 can be set to be increased as the request torque Tr* is decreased and to be increased as the battery temperature Tb is decreased. The target speed Ne* of the engine 22 at the beginning of the rapid increase (the rapid decrease as the value on the charging side) in the charge/discharge electricity Pb of the battery 50 onward can be set such that the charge/discharge electricity Pb of the battery 50 falls within the range of the input limit Win, more specifically, the charge/discharge electricity Pb of the battery 50 is increased along with a rapid increase (a rapid decrease as the value on the charging side) in the input limit Win.

In the hybrid vehicle 20 of the embodiment, the request power Pr* is lower (higher as the value on the braking side) than the request charge/discharge electricity Pbtag regardless of the battery temperature Tb when the accelerator is off with the shift position SP being the B position. Thus, the motoring of the engine 22 is performed by the motor MG1 from the beginning of the charging of the battery 50 to the beginning of the rapid increase (the rapid decrease as the value on the charging side) in the charge/discharge electricity Pb of the battery 50 regardless of the battery temperature Tb, that is, regardless of whether the time period from the beginning of the charging of the battery 50 to the beginning of the rapid increase (the rapid decrease as the value on the charging side) in the charge/discharge electricity Pb (a pre rapid increase time period) is predicted to be within the specified time period tref. However, when the battery temperature Tb is at least equal to the threshold Tbref, the request power Pr* may become at least equal to the request charge/discharge electricity Pbtag. In this case, in the time period from the beginning of the charging of the battery 50 to the beginning of the rapid increase (the rapid decrease as the value on the charging side) in the charge/discharge electricity Pb of the battery 50, when the battery temperature Tb is at least equal to the threshold Tbref, that is, when the pre rapid increase time period is not predicted to be within the specified time period tref and the request power Pr* becomes at least equal to the request charge/discharge electricity Pbtag, the motoring of the engine 22 may not be performed by the motor MG1.

In the hybrid vehicle 20 of the embodiment, when the accelerator is off with the shift position SP being the B position and the battery temperature Tb is lower than the threshold Tbref, the request charge/discharge electricity Pbtag is increased (decreased as the value on the charging side) to be higher than that at the time when the battery temperature Tb is at least equal to the threshold Tbref, so as to increase the target charge/discharge electricity Pb*, the target motoring power Pmt*, and the target speed Ne* of the engine 22 from the beginning of the charging of the battery 50 to the beginning of the rapid increase (the rapid decrease as the value on the charging side) in the charge/discharge electricity Pb of the battery 50. However, similar control may be executed when the accelerator is off with the shift position SP being the D position.

In the hybrid vehicle 20 of the embodiment, the battery 50 is configured as the lithium-ion secondary battery. However, the battery 50 may be configured as a nickel hydrogen secondary battery or the like.

In the embodiment, the engine 22 is one example of the "engine", the motor MG1 is one example of the "first motor", the planetary gear 30 is one example of the "planetary gear", the motor MG2 is one example of the "second motor", the battery 50 is one example of the "battery", and the HVECU 70, the engine ECU 24, and the motor ECU 40 are one example of the "electronic control unit".

Here, the embodiment will be summarized. When the accelerator is off with the shift position being the B position, the braking force is applied to the vehicle while the battery is charged within the range of the input limit Win of the battery by the regenerative drive of the second motor and motoring of the engine, which is in the state where the fuel injection is stopped, by the first motor. Then, at this time, if the battery temperature Tb is lower than the threshold Tbref, the request charge/discharge electricity Pbtag is increased (decreased as the value on the charging side) to be higher than that at the time when the battery temperature Tb is at least equal to the threshold Tbref (S140), so as to increase the target charge/discharge electricity Pb*, the target motoring power Pmt*, and the target speed Ne* of the engine (S150 to S170).

The present disclosure is not limited to the above embodiment in any respect and, needless to say, can be implemented in various modes within a range that does not depart from the gist of the present disclosure.

The present disclosure can be used in a manufacturing industry of hybrid vehicles, and the like.

What is claimed is:

1. A hybrid vehicle comprising:
an engine;
a first motor;
a planetary gear having three rotational elements, the three rotational elements being respectively connected to a rotational shaft of the first motor, an output shaft of the engine, and a drive shaft coupled to an axle;
a second motor connected to the drive shaft;
a battery configured to supply electricity to and receive electricity from the first motor and the second motor; and
an electronic control unit configured to:
set permissible charged electricity and permissible discharge electricity of the battery; and
control the engine, the first motor, and the second motor such that the hybrid vehicle travels while the battery is charged and discharged within a range of the permissible charged electricity and a range of the permissible discharge electricity,
wherein
the three rotational elements are connected to each other such that the rotational shaft, the output shaft, and the drive shaft are aligned in a collinear diagram,
the electronic control unit is configured to set, when the battery is continuously charged, the permissible charged electricity such that a time period from beginning of the charging to beginning of a rapid decrease in charged electricity is shortened and a decrease amount per unit time at a beginning of a rapid decrease in the charged electricity is increased as the charged electricity of the battery is increased, and
when acceleration off control for controlling the first motor and the second motor such that the battery is charged within the range of the permissible charged electricity at least in conjunction with regenerative drive of the second motor in a state where fuel injection of the engine is stopped and that a braking force corresponding to acceleration off is applied to the hybrid vehicle is executed during the off acceleration, i) in the time period, the electronic control unit is configured to control the first motor such that a motoring of the engine is performed at a first speed by the first motor or a motoring of the engine by the first motor is prevented when a predictable condition is not satisfied, and the electronic control unit is configured to control the first motor such that the motoring of the engine is performed at a second speed that is higher than the first speed by the first motor when the predictable condition is satisfied, the predictable condition being a condition that the time period is predicted to be within a specified time period, and ii) at the beginning of the rapid decrease in charged electricity onward, the electronic control unit is configured to control the first motor such that the motoring of the engine is performed at a speed at which charged electricity falls within the range of the permissible charged electricity by the first motor.

2. The hybrid vehicle according to claim 1, wherein
the electronic control unit is configured to set the permissible charged electricity such that the time period is shortened as a temperature of the battery is decreased when the charging is continued, and
the predictable condition is a condition that the temperature of the battery is lower than a specified temperature.

3. The hybrid vehicle according to claim 2, wherein
the electronic control unit is configured to control the engine such that the motoring of the engine is performed at a higher speed as the temperature of the battery is decreased under the predictable condition until the beginning of the rapid decrease in the charged electricity when the acceleration off control is executed.

4. The hybrid vehicle according to claim 1, wherein
the electronic control unit is configured to control the engine such that the motoring of the engine is performed at a higher speed as a vehicle speed is increased under the predictable condition until the beginning of the rapid decrease in the charged electricity when the acceleration off control is executed.

5. The hybrid vehicle according to claim 1, wherein
the electronic control unit is configured to set request charged electricity of the battery to be decreased as a temperature of the battery is decreased, and to set the request charged electricity of the battery to be decreased as a vehicle speed is increased under the predictable condition until the beginning of the rapid decrease in the charged electricity when the acceleration off control is executed,
the electronic control unit is configured to set target charged electricity of the battery by limiting the request charged electricity by the permissible charged electricity,
the electronic control unit is configured to set a target speed of the engine to be increased as the target charged electricity is decreased, and
the electronic control unit is configured to control the engine such that the motoring of the engine is performed at the target speed.

6. The hybrid vehicle according to claim 1, wherein
the hybrid vehicle has, as shift positions, a first travel position and a second travel position, and
a larger braking force than a braking force at the first travel position is applied to the vehicle during the acceleration off when the shift position is the second travel position.

7. The hybrid vehicle according to claim 6, wherein the electronic control unit is configured to control the engine such that the motoring of the engine is performed at a speed that corresponds to whether the predictable condition is satisfied until the beginning of the rapid decrease in the charged electricity when the accelerator is off with the shift position being the second travel position and the acceleration off control is executed.

* * * * *